United States Patent

Cavalier

Patent Number: 6,003,407
Date of Patent: Dec. 21, 1999

[54] SEALING DEVICE FOR MOTORCYCLE TOE SHIFT MECHANISM

[76] Inventor: Gregg S. Cavalier, 29 Plumb Rd., Trumbull, Conn. 06611

[21] Appl. No.: 08/684,819

[22] Filed: Jul. 22, 1996

[51] Int. Cl.[6] .................................................. G05G 1/14
[52] U.S. Cl. ...................... 74/594.1; 74/474; 74/594.2; 74/564; 384/271; 277/188 R
[58] Field of Search ................... 74/474, 519, 594.1, 74/560, 564, 512, 594.2; 277/165, 188 R, 168, 135; 384/152, 271

[56] References Cited

U.S. PATENT DOCUMENTS

| | | | |
|---|---|---|---|
| 582,750 | 5/1897 | Leaycraft | 74/594.2 |
| 2,552,371 | 5/1951 | Erickson | 74/474 |
| 2,617,505 | 11/1952 | Tatge | 74/474 |
| 3,589,781 | 6/1971 | Hanley | 384/152 |
| 3,776,611 | 12/1973 | Jentsch | 384/152 |
| 3,825,272 | 7/1974 | Townsend | 277/94 |
| 3,854,735 | 12/1974 | Maurer | 277/188 R |
| 4,173,350 | 11/1979 | Sieghartner | 277/40 |
| 4,195,853 | 4/1980 | Otsuka | 277/92 |
| 4,247,123 | 1/1981 | Potter | 277/88 |
| 4,498,679 | 2/1985 | Balezun | 277/92 |
| 4,511,151 | 4/1985 | Cook | 277/92 |
| 5,281,003 | 1/1994 | Herman | 74/594.1 |
| 5,507,200 | 4/1996 | Reed | 74/474 |
| 5,507,503 | 4/1996 | Robaina | 277/165 |
| 5,634,727 | 6/1997 | Lin et al. | 74/594.2 |

FOREIGN PATENT DOCUMENTS

| | | | |
|---|---|---|---|
| 514096 | 1/1938 | United Kingdom | 74/474 |
| 523174 | 7/1940 | United Kingdom | 74/474 |

*Primary Examiner*—Khoi Q. Ta
*Assistant Examiner*—Ankur Parekh

[57] ABSTRACT

A tubular sealing spacer is disclosed which is an improvement on the standard toe shift mechanism for connecting a toe shift lever to the transmission of a motorcycle for shifting gears during acceleration or deceleration of the motorcycle. The spacer fits over a shaft that is rotatably mounted in a housing and which has an end portion that projects beyond an outer end pace of the housing on which a toe shift lever is mounted, the spacer being located between an inner face of the toe shift lever and the outer end face of the housing. The spacer has an annular sealing member that presses on the outer end face of the housing when the parts are assembly to prevent grease that is injected between the outer surface of the shaft and the inner surface of the housing from oozing out of the housing and coating portions of the shaft, the housing, the toe shift lever and other adjacent parts.

3 Claims, 3 Drawing Sheets

SEALING DEVICE FOR MOTORCYCLE TOE SHIFT MECHANISM

BACKGROUND OF THE INVENTION

The present invention relates generally to the field of sealing devices, and more particularly to a sealing device adapted for use specifically with a particularly type of motorcycle toe shift mechanism.

It is virtually common knowledge today, especially among those who are at all knowledgeable about motorcycles, that they are driven by an internal combustion engine that operates basically on the same principles as those applicable to automobile engines, and that several of the major driving components found in the drive train of automobiles are also found in motorcycles. One of these components is the transmission, the function of which, as is also well known, is to provide a range of torque to speed ratios that permits the engine of the motorcycle (or for that matter any other type of internal combustion engine vehicle, although this discussion is confined to the motorcycle) to drive the motorcycle at varying speeds for a given amount of engine torque. Thus, the transmission provides a variety of gear ratios through which the engine transmits power to the driving wheel of the motorcycle so that the power transmitted to the driving wheel is greatest when the motorcycle first begins to move to achieve maximum acceleration, and is least when the motorcycle is traveling at a relatively high rate of speed in order to maintain that speed or accelerate slowly at the same range of engine RPMs as that which provided the high engine power for maximum acceleration.

For several decades there has been a gradual shift in the manner of operation of automobile transmissions from fully manual to fully automatic, so that the vehicle driver neither has to operate a clutch mechanism or a transmission shift lever. This shift, however, has not occurred with respect to motorcycles for a number of reasons; one is the high level of complexity of automatic transmissions and the consequent additional cost that would be entailed in providing motorcycles with this feature. Another is the added weight of the transmission that would necessitate a more powerful engine for a given size motorcycle than is otherwise necessary. Still another reason, and a significant one, is that a large segment of those who ride motorcycles prefer a manual transmission since the manual shifting of gears and operation of a clutch mechanism contribute significantly to the shear pleasure of operating a motorcycle.

For whatever the reason, motorcycle manufacturers have steadfastly retained manual shifting of gears in motorcycles. The only significant improvement that has been made is that the manually operated gear shift lever that was formerly mounted on a frame adjacent the gas tank and moved in a forward and backward direction to select gears, in a manner similar to the movement of a floor mounted shift lever in an automobile having an automatic transmission, has been replaced with a toe shift mechanism by which the gear are shifted. Thus, in virtually all motorcycles manufactured today, there is a hand grip and cable mechanism by which the operator engages and disengages the clutch mechanism to permit the transmission gears to shift, and there is a toe shift mechanism by which the operator actually shifts the gears. The toe shift mechanism includes a first lever which is connected to one end of a shaft that is rotatably mounted in a housing, with an annular spacer around the shaft between the outer end of the housing and the lever to prevent the shaft from shifting longitudinally within the housing. A second lever is connected to the other end of the shaft, and is also connected to a rod that extends into the transmission assembly which in turn is connected to a ratchet mechanism that actually shifts the gears. When the operator momentarily depresses the first lever, it oscillates the shaft within the housing, which in turn rocks the second lever back and forth to cause the rod to reciprocate, thereby actuating the ratchet mechanism in the transmission to shift the gears. The construction of the ratchet mechanism is such that the gears are shifted in sequence, that is, from first to second, to third, to fourth and then to fifth, with the reverse sequence being followed when shifting down from the highest speed gear to the lowest. It is thus apparent that during routine operation of a motorcycle, especially within urban areas having heavy traffic and frequent traffic signals and/or stop signs, or other areas of frequent acceleration and deceleration, the aforementioned shaft is constantly being oscillated within the housing.

It is therefore necessary to maintain the shaft and shaft housing constantly lubricated to prevent excessive wear on the adjacent surfaces of these parts. Without such lubrication, these adjacent surfaces would wear excessively and unevenly over a period of time, with the result that the shaft would not fit properly in the housing and would begin to wobble during activation of the toe shift mechanism This in turn would cause additional wear on various portions of the shaft and the housing to the point where the toe shift mechanism would cause erratic shifting of the transmission gears. The lubrication is accomplished in much the same manner as greasing wheel bearing on an automobile, that is, by injecting grease into the housing through a suitable grease fitting mounted on the housing.

The problem that occurs is that the nature of the toe shift mechanism is such that grease can seep or ooze between the inner wall of the housing and the outer wall of a shaft, since there are no grease seals within the housing to prevent the grease from oozing out. The result is that over a period of time, grease gradually coats the protruding portion of the shaft, the surrounding housing, the annular spacer between the adjacent end faces of the housing and the annular spacer, and even portions of the lever that connects the shaft with the foot pedal by which the shaft is rotated. Typically, some of these parts are chrome plated for decorative purposes, and the presence of grease renders them unsightly. It should be understood that typically the owners of motorcycles of the type under consideration, which are typically relatively expensive, high end prestigious models of motorcycles, such as those manufactured by Harley-Davidson, are very sensitive about the appearance of their vehicles, and they meticulously maintain them, constantly cleaning them to avoid the buildup of grease on and around the toe shift mechanism. This, of course, requires some degree of effort, is time consuming and considerably annoying to the great bulk of owners of this type of motorcycle.

While it might appear obvious simply to provide suitable sealing elements, such as O-rings, within the housing to prevent grease from escaping, the problem is that the manufacturer of these motorcycles has been using the same parts for the toe shift mechanism for so long, and it has been so successful, that it is unlikely that the manufacturer will expend either the effort or the money to redesign the shaft housing and the shaft to accommodate any form of sealing elements. In the approximately 15 years that this toe shift mechanism has been on the market, approximately 150,000 units have been sold, and redesigning these parts simply to avoid a vexing problem to the operators would not be cost effective for the manufacturer.

Thus, there is a need for a sealing device for motorcycles having this type of toe shift mechanism which replaces the existing annular spacer so as to maintain the same spacing between the inner face of the toe shifting lever and the outer face of the grease housing that presently exists yet prevents the escape of grease between the adjacent ends of the grease housing and spacer.

SUMMARY OF THE INVENTION

The present invention provides a simple and highly effective sealing spacer that completely eliminates the problems encountered with the prior art spacer. In its broader aspects, the present invention is utilized in a motorcycle transmission toe shift mechanism for connecting a toe shift lever to the transmission gear shift lever for shifting the gears of a motorcycle transmission during acceleration and deceleration of the motorcycle. The toe shift mechanism comprises an elongate tubular housing having opposite annular end faces and a bore having a predetermined diameter extending substantially between the end faces. An elongate shaft is rotatably received within the housing, and has a central portion with a diameter that corresponds to the predetermined diameter of the bore. The shaft also has opposed end portions, one of which has a smaller diameter than the predetermined diameter and a transition portion that changes from the predetermined diameter to the smaller diameter. A major portion of the length of the central portion is received within the housing, and a relatively short portion of the central portion, together with the transition portion and the smaller diameter end portion extend beyond the adjacent annular end face of the housing, and the other end portion of the shaft extends beyond the opposite annular end face of the housing. A first elongate lever is connected to the smaller diameter end portion of the shaft in spaced relationship with the adjacent annular end face of the housing. A second elongate lever is connected to the other end portion of the shaft so that the shaft and the first and second levers oscillate as a unit when the other end of the first lever is rocked about the shaft. In this environment, the invention is the improvement which comprises a tubular sealing spacer mounted on the shaft between the adjacent annular end face of the housing and the first lever, the sealing spacer having opposite annular end faces, one of which is in engagement with the adjacent annular end face of the housing, the other of which is in engagement with the first lever. The sealing spacer includes a bore with an internal configuration that corresponds substantially to the external configuration of the one end portion of the shaft that extends beyond the adjacent annular end face of the housing, and sealing means for engaging the adjacent annular end face of the housing in sealing relationship therewith, so that the sealing spacer prevents grease from escaping between the adjacent annular end face of the housing and the one annular end face of the tubular sealing spacer.

In some of its more limited aspects, the sealing means comprises an annulus having an outer peripheral surface that projects beyond the one annular end face of the tubular sealing spacer so that the annulus is deformed radially outwardly when the annular end face of the sealing member is forcibly engaged with the annular end face of the grease housing. Also, the sealing spacer includes an annular recess formed as a groove which extends inwardly from both the annular end face and the peripheral surface of the sealing spacer, thereby permitting the annulus to deform radially outwardly when the annular end face of the sealing spacer is forcibly engaged with the annular end face of the grease housing.

Having briefly described the general nature of the present invention, it is a principal object thereof to provide a sealing spacer for the toe shift mechanism of a motorcycle that prevents grease from oozing out of the toe shift mechanism and coating adjacent parts thereof, thereby creating an unsightly and potentially damaging situation.

It is another object of the present invention to provide a sealing spacer for the toe shift mechanism of a motorcycle that can be inexpensively manufactured and marketed, easily substituted for a non-sealing spacer provided by the manufacturer of the motorcycle and will effectively overcome the above described problems.

These and other objects and advantages of the present invention will become more apparent from an understanding of the following detailed description of a presently preferred mode of carrying out the present invention when considered in conjunction with the accompanying drawings.

DETAILED DESCRIPTION OF THE INVENTION

Figure 1:
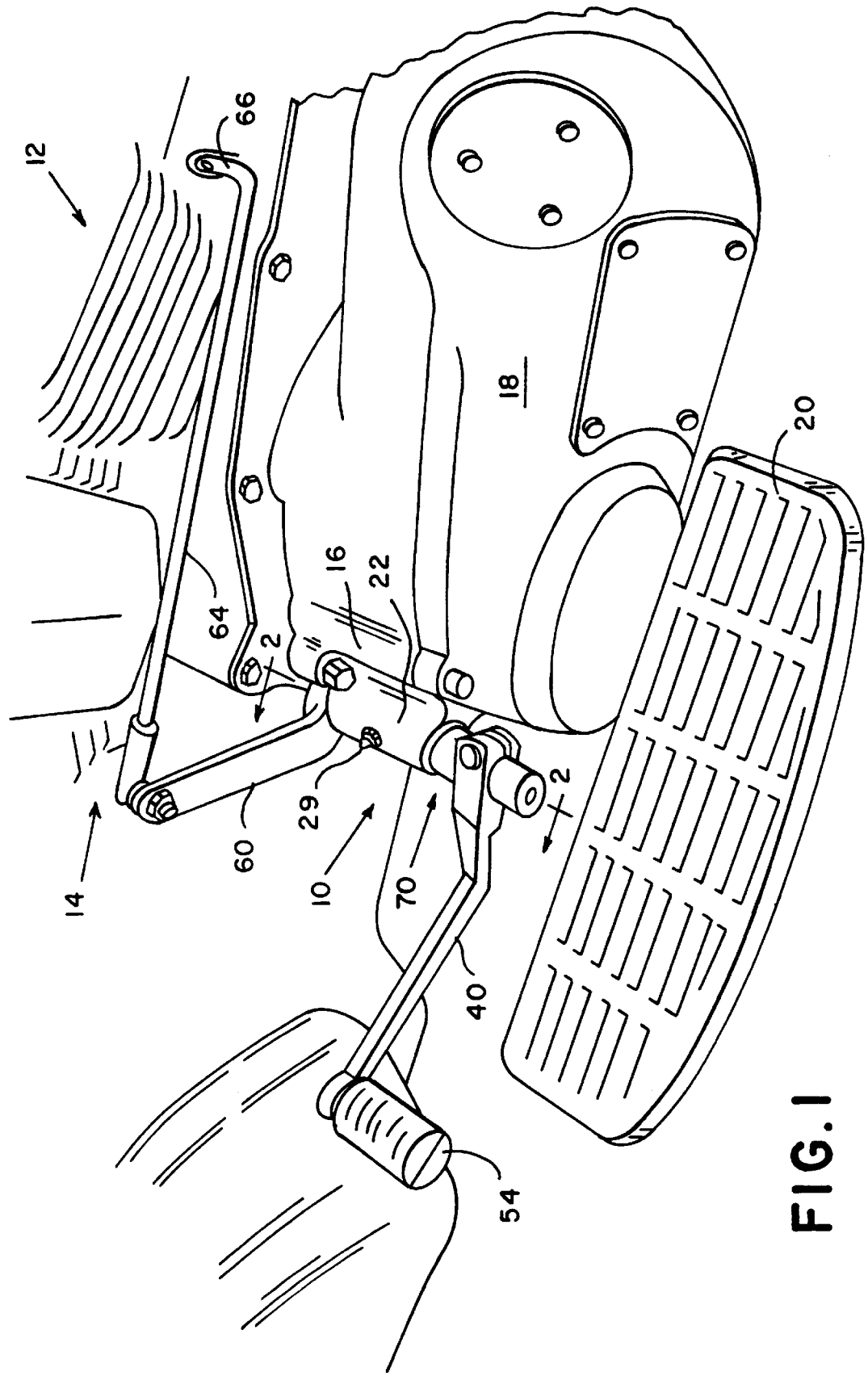
FIG. 1 is a perspective view of the midportion of a typical motorcycle showing the lower engine portion thereof where the toe shift mechanism is located.

Referring now to the drawings, and particular to FIG. 1 thereof, the reference numeral 10 designates generally a motorcycle transmission toe shift mechanism which connects a toe shift lever to a transmission gear shift lever for shifting the gears of a motorcycle transmission during acceleration and deceleration. The toe shift mechanism 10 is typically located in the central portion of a motorcycle, indicated generally by the reference numeral 12, adjacent to the engine, a portion of which is indicated generally by the reference numeral 14, and adjacent to the forward end 16 of the primary chain case 18 and a standard foot rest 20 which is suitably secured to a portion of the frame of the motorcycle. The chain case 18 encloses a drive chain (not shown) which connects the output of the transmission with the rear driving wheel through a small sprocket gear driven by the output gear of the transmission and a relatively larger sprocket gear fixedly mounted on a rear axle in coaxial relationship with the rear wheel. The foregoing structure, both illustrated and not illustrated, is very well known among those skilled in the motorcycle art and is relatively well known to a large segment of the general public, is not an integral part of the present invention, and therefore is not deemed to require further description or illustration for a full understanding of the present invention.

Figure 3:
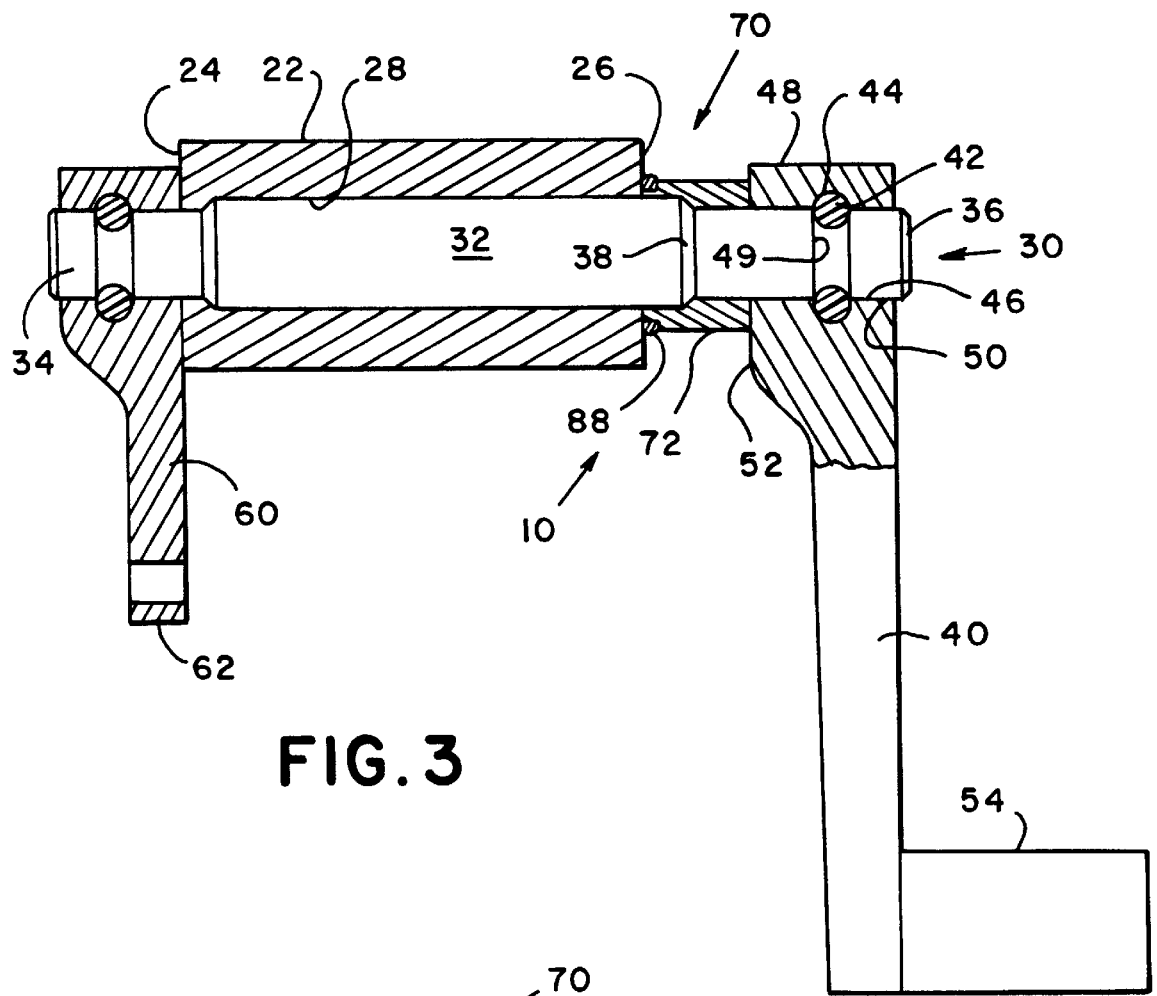
FIG. 3 is a sectional view similar to that shown in FIG. 2 but illustrating the sealing device of the present invention.

With reference now to FIGS. 1 and 3, it will be seen that the forward end 16 of the primary chain case 18, which itself is preferably formed as a single casting extending from the forward end 16 to the sprocket mounted coaxially with the rear wheel, constitutes an elongate tubular housing 22 which has opposite inner and outer annular end faces 24 and 26 (FIG. 3), the inner end face 24 being adjacent to the engine 14 and the outer end face 26 being remote from the engine 14. The housing 22 is machined to have a bore 28 extending therethrough which has a predetermined diameter extending substantially between the end faces 24 and 26. A standard form of grease fitting 29 is mounted on the housing for a purpose further described below.

As best seen in FIG. 3, the toe shift mechanism 10 further comprises an elongate shaft, designated generally by the reference numeral 30, which is rotatably received within the bore 28 of the housing 22. A central portion 32 of the shaft 30 has a diameter that corresponds substantially to the predetermined diameter of the bore 28 so that the central portion 32 of the shaft 30 fits within the bore 28 with a very close tolerance, generally in the order of two to three thousandths. The shaft 30 has an inner end portion 34 which extends beyond the end inner face 24 of the housing 22, and an opposed outer end portion 36 which extends beyond the outer end face 26 of the housing 22 and which has a diameter smaller than the predetermined diameter of the central portion 32. The shaft 30 also includes a transition portion 38 which connects the central portion 32 with the outer end portion 36. Thus, it will be seen that a major portion of the length of the central portion 32 is received within the housing 22, and a relatively short portion of the central portion 32, together with the transition portion 38 and the smaller diameter end portion 36 extend beyond the outer annular end face 26 of the housing 22, and the other end portion 34 of the shaft 30 extends beyond the inner annular end face 24 of the housing 22.

Figure 2:
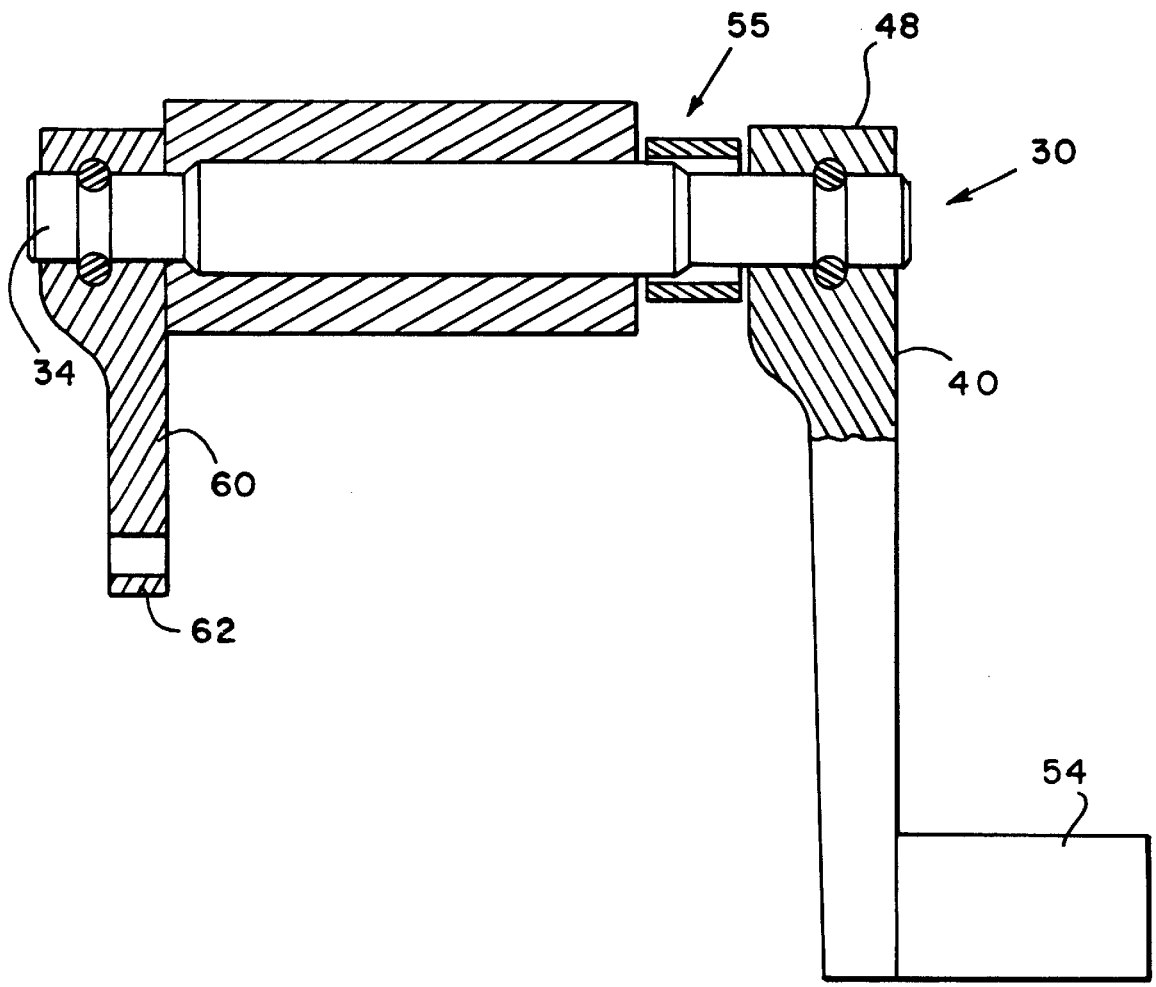
FIG. 2 is a sectional view of the toe shift mechanism shown in FIG. 1 taken on the line 2—2 of FIG. 1, and illustrating a typical annular spacer member utilized to prevent movement of a portion of the toe shift mechanism.

An elongate lever 40 is suitably fixedly connected to the smaller diameter end portion 36 of the shaft 30, as by a pair of bolts 42 which pass through mating recesses 44 formed in a bore 46 of the inner end 48 of the lever 40 and a groove 49 formed in the outer surface 50 of the end portion 36 of the shaft 30, thereby securing the lever 40 to the shaft 30. It will be noticed that the shaft 40 is mounted on the shaft 30 with the inner surface 52 of the end 48 of the shaft 40 in spaced relationship with the outer annular end face 26 of the housing 22, and is maintained in that relationship by the sealing spacer device 70 of the present invention as more fully described below. A suitable toe portion 54 is formed on the outer end of the lever 40 by which the lever 40 is oscillated about the axis of the shaft 30. Prior to the present invention, it has been the practice of the motorcycle manufacturer to insert a rather loose fitting tubular spacer, indicated generally by the reference numeral 55 in FIG. 2, between the inner end face 52 of the end portion 48 of the lever 40 and the outer annular end face 26 of the housing 22 to prevent the shaft 30 and the parts connected thereto from shifting axially with respect to the housing 22. The spacer 55 does not have a tight fit around the outer portion 36 or the transition portion 38 of the shaft 30, with the result that the spacer 55 can wobble during actuation of the toe shift mechanism, thereby causing excessive wear on both end faces of the spacer 55.

A second elongate lever 60 is connected to the other end portion 34 of the shaft 30, such as in a manner similar to that already described for the lever 40, with the result that the shaft 30, the lever 40 and the lever 60 all oscillate as a unit when the toe portion of the lever 40 is depressed. The outer end 62 of the lever 60 is suitably connected to a rod 64 (FIG. 1), the other end 66 of which is suitably connected into the transmission of the motorcycle in a manner well known in the art and which need not be further shown or described for a full understanding of the invention. For this purpose, it is only necessary to understand that as the lever 40 is oscillated about the axis of the shaft 30 by depression of the toe portion 54, the shaft 30 oscillates within the housing 22 and thereby oscillates the lever 60, the remote end 62 of which thereby reciprocates the rod 64 to operate the transmission to cause the aforementioned shifting of the gears during acceleration and deceleration.

As briefly mentioned above, the problem that arises is that it is necessary to maintain a certain amount of grease within the housing 22 between the inner surface 28 thereof and the outer surface of the central portion 32 of the shaft 30 that is within the housing 22, which is conveniently injected through the grease fitting 29. With the arrangement shown in FIG. 2, it will be apparent that there is nothing to stop grease within the housing 22 from gradually oozing out between the inner surface of the housing 22 and the outer surface of the shaft 30 adjacent the outer end face 26 of the housing 22, since there is no seal at that location. Thus, over a period of time, grease collects around the portion of the shaft 30 that is covered by the cylindrical spacer 55 that is currently provided by the motorcycle manufacturer. If not laboriously removed, it eventually oozes around the spacer and spreads to the toe shift lever 40 and other adjacent parts as previously mentioned.

While this problem may not seem significant to some, it should be remembered, also as briefly mentioned above, that the motorcycles under consideration and for which the present invention was specifically designed, are relatively expensive, top of the line motorcycles which are typically very elaborate, with considerable use of highly polished chrome on many parts of the engine and transmission, as well as other operating and accessory parts of the motorcycle. The owners of these motorcycles tend to be very fussy about the appearance of these parts and the motorcycle in general, since they often enter their motorcycles in shows for sale and other purposes, as a result of which they often become highly frustrated over the necessity for constant cleaning of the aforementioned parts which are subjected to persistent grease deposits from the housing 22 and the shaft 30.

Figure 4:
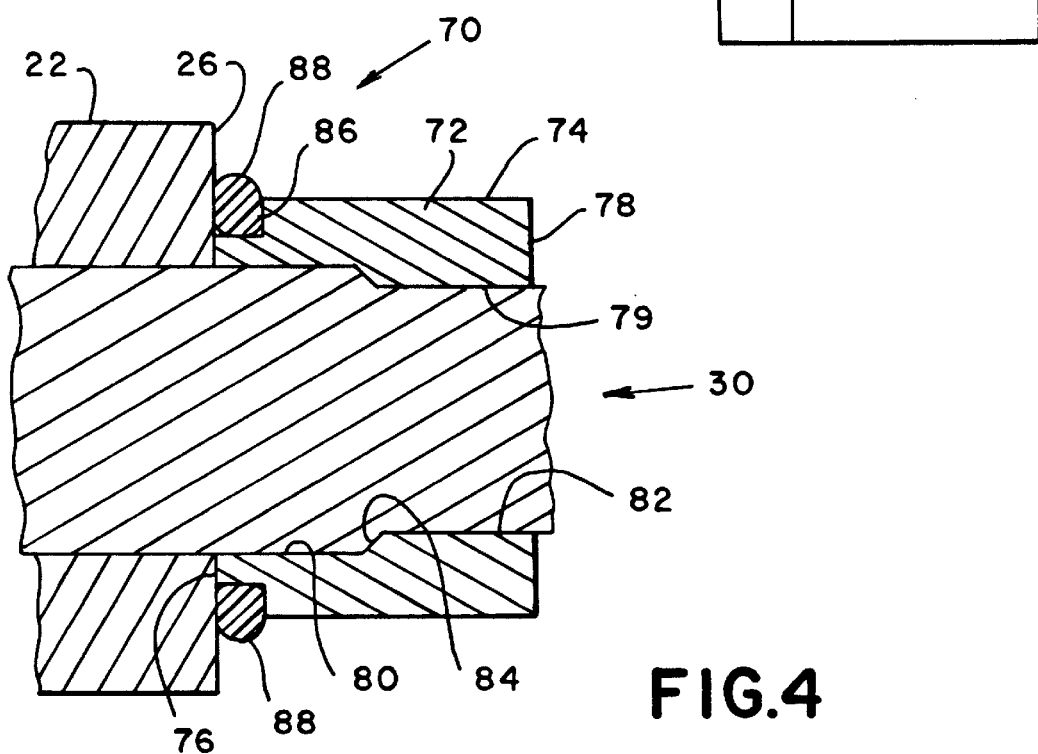
FIG. 4 is an enlarged fragmentary view of the sealing device portion of the toe shift mechanism shown in FIG. 3.

The present invention provides a relatively simple but highly effective solution to this problem by providing a sealing spacer which accomplishes the dual functions of properly spacing the inner end of the toe shift lever from the outer end face of the housing, and also provides an effective grease seal at the location where it is most likely to ooze out of the grease housing and contaminate adjacent parts of the motorcycle. Thus, the sealing spacer of the present invention is indicated generally by the reference numeral 70, as seen in FIGS. 1 and 3, and, as best seen in FIG. 4, comprises a tubular body member 72 having a cylindrical outer surface 74 which extends over a major portion of the length of the body member 72. The body member 72 has inner and outer opposite annular end faces 76 and 78 respectively which are adapted to be in face to face engagement with the outer end face 26 of the grease housing 22 and the inner surface 52 of the inner end 48 of the lever 40 respectively. The body member 72 has a bore 79 extending therethrough which has a larger diameter portion 80 that corresponds to the predetermined diameter of the inner surface 28 of the grease housing 22, a smaller diameter portion 82 that corresponds to the diameter of the outer end portion 36 of the shaft 30, and a transition portion 84 that connects the portions 80 and 82. Thus, the bore 79 has an internal configuration that corresponds to the external configuration of the portions of the shaft 30 that extend beyond the end face 26 of the grease housing 22. The tolerance of the fit of the body member 72 over the shaft 30 is very snug, being typically in the same order as that of the fit between the central portion 32 of the shaft 30 and the bore 28 of the housing 22.

The sealing spacer 70 further includes an annular recess 86 which is formed in the outer cylindrical surface 74 of the body member 72 adjacent the end face 76. As best seen in FIG. 4, an annular sealing member 88, which preferably is an O-ring sealing member, is received in the recess 86 so as to be pressed into forcible engagement with the outer end face 26 of the grease housing 22 when the body member 72 is mounted on the shaft 30. It will be seen that the recess 86 is formed so as to encompasses only approximately a one quarter arc of the periphery of the sealing member 88, and the thickness or diameter, as the case may be, of the sealing member 88 is selected such that the outer peripheral surface thereof extends slightly beyond the end face 76 of the body member 72 when the sealing member is in its unstressed condition when the body member 72 is not mounted on the shaft 30. But when the body member 72 is mounted on the shaft 30, and the end face 76 is forcibly pressed against the end face 26 of the grease housing 22, the sealing member deforms slightly, as shown in FIG. 4, so as to form a highly effective seal with the end face 26 of the grease housing 22.

Thus, it should now be apparent that the sealing spacer 70 of the present invention provides the dual functions of properly spacing the toe shift lever 40 with respect to the outer end face 26 of the housing 22, and also effectively sealing the outer end face 26 and the adjacent face 76 of the spacer 70 to prevent the escape of grease from within the housing 22.

It is to be understood that the present invention is not to be considered as limited to the specific embodiment described above and shown in the accompanying drawings, which is merely illustrative of the best mode presently contemplated for carrying out the invention and which is susceptible to such changes as may be obvious to one skilled in the art, but rather that the invention is intended to cover all such variations, modifications and equivalents thereof as may be deemed to be within the scope of the claims appended hereto.

I claim:

1. In a motorcycle transmission toe shift mechanism for connecting a toe shift lever to the transmission gear shift lever for shifting the gears of a motorcycle transmission during acceleration and deceleration of the motorcycle, said toe shift mechanism comprising:
   A. an elongate tubular housing having inner and outer opposite annular end faces and a bore having a predetermined diameter extending substantially between said end faces,
   B. an elongate shaft rotatably received within said housing, said shaft having
      (1) a central portion with a diameter that corresponds to said predetermined diameter of said bore and
      (2) opposed end portions, one of which has a smaller diameter than said predetermined diameter and a transition portion that changes from said predetermined diameter to said smaller diameter,
      a major portion of the length of said central portion being received within said housing and a relatively short portion of said central portion, said transition portion and said smaller diameter end portion extending beyond said outer annular end face of said housing, the other end portion of said shaft extending beyond said inner annular end face of said housing,
   C. a first elongate lever connected to said smaller diameter end portion of said shaft in spaced relationship with said outer annular end face of said housing,
   D. a second elongate lever connected to the other end portion of said shaft so that said shaft and said first and second levers oscillate as a unit when the other end of said first lever is rocked about said shaft,
   the improvement comprising a tubular sealing spacer mounted on said shaft between said outer annular end face of said housing and said first lever, said sealing spacer having
      A. opposite annular end faces, one of which is in engagement with said outer annular end face of said housing, the other of which is in engagement with said first lever,
      B. a bore with an internal configuration that corresponds substantially to the external configuration of said one end portion of said shaft that extends beyond said outer annular end face of said housing, and
      C. sealing means for engaging said outer annular end face of said housing in sealing relationship therewith, whereby said sealing spacer prevents grease from escaping between said outer annular end face of said housing and said annular end face of said tubular sealing spacer.

2. The improvement as set forth in claim 1 wherein said sealing means comprises an annulus having an outer peripheral surface that projects beyond said one annular end face of said tubular sealing spacer so that said annulus is deformed radially outwardly when said annular end face of said sealing member is forcibly engaged with said outer annular end face of said housing.

3. The improvement as set forth in claim 2 wherein said sealing spacer includes an annular recess formed as a groove which extends inwardly from both said annular end face and the outer peripheral surface of said sealing spacer, thereby permitting said annulus to deform radially outwardly when said annular end face of said sealing spacer is forcibly engaged with said annular end face of said grease housing.

* * * * *